United States Patent
Hannington et al.

(10) Patent No.: US 9,616,643 B2
(45) Date of Patent: Apr. 11, 2017

(54) EMBOSSED THERMOPLASTIC LABEL

(71) Applicant: Avery Dennison Corporation, Pasadena, CA (US)

(72) Inventors: Michael Hannington, Madison, OH (US); Peter J. Heederik, Leiden (NL); Osei Owusu, Mentor, OH (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 13/623,152

(22) Filed: Sep. 20, 2012

(65) Prior Publication Data

US 2013/0071589 A1    Mar. 21, 2013

Related U.S. Application Data

(60) Provisional application No. 61/537,045, filed on Sep. 20, 2011.

(51) Int. Cl.
*B32B 3/30* (2006.01)
*B32B 1/02* (2006.01)
(Continued)

(52) U.S. Cl.
CPC ............... *B32B 27/32* (2013.01); *B32B 3/30* (2013.01); *B32B 7/02* (2013.01); *B32B 7/06* (2013.01);
(Continued)

(58) Field of Classification Search
CPC ......... B29C 59/02; B29C 59/046; B32B 1/02; B32B 3/10; B32B 3/30; B32B 38/06;
(Continued)

(56) References Cited

U.S. PATENT DOCUMENTS 3,036,945 A * 5/1962 Souza ........................ 428/379
3,340,135 A * 9/1967 Avery ........................ 428/184
(Continued)

FOREIGN PATENT DOCUMENTS

DE      102008023653    11/2009
JP      60-255416       12/1985
(Continued)

OTHER PUBLICATIONS

International Search Report issued in corresponding International Application No. PCT/US2012/056180 dated Aug. 22, 2013.
(Continued)

*Primary Examiner* — Patricia L Nordmeyer
(74) *Attorney, Agent, or Firm* — Avery Dennison Corporation

(57) ABSTRACT

An embossed thermoplastic label includes (a) a facestock having an upper surface and a lower surface with at least one layer and the layer has at least one thermoplastic resin, and (b) the facestock includes at least one embossed pattern on the upper surface of the facestock. The embossed pattern includes at least one embossed section and at least one unembossed section on the facestock. An intermediate configuration is also disclosed. A method is provided for embossing a thermoplastic label. The embossed thermoplastic label is useful in various labeling and brand awareness applications and provides visual and textural effects.

23 Claims, 7 Drawing Sheets

(51) Int. Cl.
| | |
|---|---|
| *B32B 38/10* | (2006.01) |
| *B29C 59/02* | (2006.01) |
| *B32B 3/10* | (2006.01) |
| *B32B 38/06* | (2006.01) |
| *B32B 7/06* | (2006.01) |
| *B32B 27/32* | (2006.01) |
| *B32B 27/08* | (2006.01) |
| *B32B 27/36* | (2006.01) |
| *B32B 7/02* | (2006.01) |
| *B32B 7/12* | (2006.01) |
| *B32B 27/20* | (2006.01) |
| *B32B 27/34* | (2006.01) |
| *B32B 37/12* | (2006.01) |
| *B32B 38/00* | (2006.01) |
| *B29C 59/04* | (2006.01) |

(52) U.S. Cl.
CPC ............... *B32B 7/12* (2013.01); *B32B 27/08* (2013.01); *B32B 27/20* (2013.01); *B32B 27/34* (2013.01); *B32B 27/36* (2013.01); *B32B 27/365* (2013.01); *B32B 38/06* (2013.01); *B29C 59/046* (2013.01); *B32B 37/12* (2013.01); *B32B 38/145* (2013.01); *B32B 2250/24* (2013.01); *B32B 2270/00* (2013.01); *B32B 2307/30* (2013.01); *B32B 2307/402* (2013.01); *B32B 2307/4026* (2013.01); *B32B 2307/41* (2013.01); *B32B 2307/412* (2013.01); *B32B 2307/738* (2013.01); *B32B 2307/75* (2013.01); *B32B 2519/00* (2013.01); *Y10T 156/1041* (2015.01); *Y10T 156/11* (2015.01); *Y10T 428/1352* (2015.01); *Y10T 428/1476* (2015.01); *Y10T 428/24479* (2015.01); *Y10T 428/24612* (2015.01)

(58) Field of Classification Search
CPC ....... B32B 38/10; B32B 7/06; B32B 2519/00; B32B 37/12; B32B 38/145; B32B 7/02; B32B 7/12; B32B 27/20; B32B 27/34; B32B 27/365; B32B 27/08; B32B 27/32; B32B 27/36; B32B 2250/24; B32B 2270/00; B32B 2307/30; B32B 2307/402; B32B 2307/4026; B32B 2307/41; B32B 2307/412; B32B 2307/738; B44C 1/24; B44C 3/085; Y10T 156/1041; Y10T 156/11; Y10T 428/24612; Y10T 428/1352; Y10T 428/14
USPC .............................. 428/40.1, 42.1, 343, 354
See application file for complete search history.

(56) References Cited

U.S. PATENT DOCUMENTS

| | | | |
|---|---|---|---|
| 3,542,630 A * | 11/1970 | Pfiffner ................... | 428/141 |
| 3,908,065 A | 9/1975 | Stigen | |
| 4,380,564 A * | 4/1983 | Cancio et al. ............... | 428/167 |
| 4,802,295 A | 2/1989 | Darr | |
| 4,910,033 A | 3/1990 | Bekele et al. | |
| 4,913,858 A * | 4/1990 | Miekka ................ | B29C 59/022 |
| | | | 264/1.34 |
| 5,310,222 A * | 5/1994 | Chatwin ................ | G03H 1/02 |
| | | | 283/109 |
| 5,824,393 A | 10/1998 | Nakamura | |
| 5,965,375 A | 10/1999 | Valkirs | |
| 6,613,411 B2 * | 9/2003 | Kollaja et al. ............ | 428/40.1 |
| 7,090,907 B2 | 8/2006 | Fearn et al. | |
| 2002/0119292 A1 * | 8/2002 | Venkatasanthanam et al. ........................ | 428/174 |

FOREIGN PATENT DOCUMENTS

| | | |
|---|---|---|
| JP | 3-88579 | 4/1991 |
| JP | 2002-072887 | 3/2002 |
| RU | 2007-114369 | 10/2008 |

OTHER PUBLICATIONS

International Preliminary Report on Patentability issued in corresponding international Application No. PCT/US2012/056180 dated Mar. 25, 2014.

* cited by examiner

EMBOSSED THERMOPLASTIC LABEL

CROSS REFERENCE TO RELATED APPLICATION

The present application claims the benefit of U.S. Provisional Patent Application No. 61/537,045 filed Sep. 20, 2011, which is incorporated herein by reference in its entirety.

FIELD

The present invention involves an embossed label. More particularly, an embossed thermoplastic label that is useful in various labeling and brand identification applications which include labeling of various consumer goods and services and to increase brand awareness. The embossed label or intermediate label constructions can be applied to flat, shaped or un-textured surfaces to give the surface of the container and improved aesthetic look such as one having embossed features.

DESCRIPTION OF THE RELATED ART

Articles of commerce, including consumer goods or consumer package goods, are generally labeled to convey information about an article to include its identity, composition, use, source or manufacturer and the like. Labels can also be used to provide additional functions including security, brand identity, decoration, and surface texture. Surface texture or topography can be decorative and/or provide other uses such as improved grasping or handling of a container.

One method of providing a container with raised or embossed features is to incorporate such features into the container itself. For example, it is known to manufacture a glass or plastic container made by a molding or other forming process such that the container itself includes integrally defined ribs or other projections. Known containers with integrally formed raised or embossed features (referred to herein as "integrally embossed containers") are described in U.S. Pat. No. 4,802,295 to Darr and U.S. Pat. No. 4,910,033 to Bekele et al., both of which are hereby incorporated herein by reference. Such manufacturing methods provide suitable containers, but the process is highly specific, and if it is desired for a container to have different raised features, the manufacturing molds or fixtures must be modified and/or replaced. Such modifications and replacements can be relatively difficult, expensive, and/or time-consuming.

Containers having un-textured surfaces which are subsequently treated or modified to include raised or embossed features are an alternative to integrally embossed containers. For example, it is known to provide three-dimensional labels or sheets of material which provide an otherwise un-textured surface with raised or embossed features. Materials of this type are described in U.S. Pat. No. 5,965,235 to McGuire et al. and U.S. Pat. No. 7,090,907 to Fearn et al., both of which are hereby incorporated herein by reference. By using a container with an un-textured surface, several disadvantages of integrally embossed containers can be avoided. For example, containers incorporating the combination of an un-textured surface and a three-dimensional label are more easily customized to include a wide variety of embossment profiles, in contrast to integrally embossed containers which, by their very nature, can include only a single embossment profile. However, there are a number of functional and cost disadvantages associated with known materials and systems which apply raised or embossed features to otherwise un-textured surfaces, and the methods and materials described below address and overcome these disadvantages.

BRIEF SUMMARY OF THE INVENTION

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In an embodiment of the present invention an embossed thermoplastic label comprises (a) a facestock having an upper surface and a lower surface and at least one layer where the layer includes at least one thermoplastic resin, (b) the facestock includes at least one embossed pattern on the upper surface of the facestock and the embossed pattern has at least one embossed section and at least one unembossed section on the facestock.

In another embodiment of the invention, the facestock of the embossed thermoplastic label further includes at least one print layer.

In embodiments relating to the at least one print layer, the print layer of the thermoplastic label can be formed before the embossing pattern is formed, or is formed when the embossing pattern is formed, such as substantially simultaneously, or is formed after the embossing pattern is formed, e.g. sequentially, or a combination of two or more of any of the foregoing manners of formation. The at least one print layer of the embossed thermoplastic label may be created by forming the embossed pattern on the upper surface of the facestock; on the lower surface of the facestock; on an internal surface of the facestock where the facestock is multilayered; or a combination of two or more of any of the foregoing manners of formation. The embossed thermoplastic label may have a facestock with an embossed pattern on the upper surface of the facestock and a print layer or indicia on the upper surface of the facestock.

In another embodiment, the print/indicia layer is one in the same as the embossed pattern. In a yet still further embodiment, the print/indicia layer is a separate and distinct layer from the embossed pattern. In another embodiment, a print/indicia layer is applied to the upper surface of the facestock. An embossed pattern is then applied over the print/indicia layer so that the embossed pattern and the print/indicia are aligned with one another. The print/indicia may be in line with the embossed section of the embossed pattern or the unembossed section of the embossed pattern. It is also contemplated by the present invention that the print/indicia and the embossed pattern are not in line with another. In another embodiment, the embossed pattern is first applied to the upper surface of the facestock and the print/indicia is applied over the embossed pattern. Additionally, the print layer or indicia may be one or more of a logo, a watermark, a bar code, generic information, graphical depictions, designs or a combination of two or more of any of the foregoing print layers or indicia.

In another embodiment of the invention the embossed thermoplastic label further comprises (c) an adhesive layer that has an upper surface and a lower surface where the upper surface of the adhesive layer is adhesively joined to the lower surface of the facestock, and (d) a release liner that has an upper surface and a lower surface where the upper surface of the release liner is releasably joined to the lower surface of the adhesive layer.

In another embodiment of the current invention, a label described in any of the embodiments has an adhesive layer where the adhesive layer is thinner at an embossed section than at an un-embossed section.

An additional embodiment of the invention includes the embossed pattern of the embossed thermoplastic label is formed in the facestock after the adhesive layer has been joined to the facestock and the release liner has been joined to the adhesive layer.

Another embodiment of the present invention relates to forming the embossed pattern of the embossed thermoplastic label in the facestock after the adhesive layer has been joined to the facestock and the release liner has been joined to the adhesive layer. A container is then labeled with this embossed thermoplastic label such that the lower surface of the adhesive layer is adhesively joined to an outside surface of the container giving the container an embossed appearance.

In another embodiment of the invention the facestock of the embossed thermoplastic label has a first layer with an upper surface and a lower surface and includes at least one thermoplastic resin, and a second layer that has an upper surface and a lower surface with at least one thermoplastic resin, where the upper surface of the second layer underlies the lower surface of the first layer. The at least one thermoplastic resin of the first layer has a Vicat softening point that is at least 20° C. lower than the Vicat softening point of the at least one thermoplastic resin of the second layer, and the at least one embossed pattern is on the upper surface of the first layer.

In other embodiments of the current invention, the facestock is composed of multilayers. One embodiment of the invention is where the facestock of the embossed thermoplastic label has a first layer with an upper surface and a lower surface with at least one thermoplastic resin. A second layer has an upper surface and a lower surface and includes at least one thermoplastic resin. A third layer has an upper surface and a lower surface and includes at least one thermoplastic resin, where the first layer and second layer and third layer are different from each other. The upper surface of the second layer underlies the lower surface of the first layer. The upper surface of the third layer underlies the lower surface of the second layer, with each of the at least one thermoplastic resins of the first layer and the second layer having a Vicat softening point that is at least 20° C. lower than the Vicat softening point of the at least one thermoplastic resin of the third layer. The at least one embossed pattern is on the upper surface of the first layer.

In another embodiment of the invention the facestock of the embossed thermoplastic label includes a first layer having an upper surface and a lower surface with at least one thermoplastic resin. A second layer has an upper surface and a lower surface with at least one thermoplastic resin. A third layer has an upper surface and a lower surface with at least one thermoplastic resin. The first layer, second layer and third layer are different from each other For instance, the at least one thermoplastic resins used in the first, second, and/or third layer are different from one another in one embodiment contemplated by the present invention, such as by composition, thickness, transparency, translucency, coloration or the like. The upper surface of the second layer underlies the lower surface of the first layer. The upper surface of the third layer underlies the lower surface of the second layer. Each of the at least one thermoplastic resins of the first layer and the second layer has a Vicat softening point that is at least 20° C. lower than the Vicat softening point of the at least one thermoplastic resin of the third layer. The at least one embossed pattern is on the upper surface of the first layer. The first layer has a least one thermoplastic resin and is clear or transparently colored. The second layer has at least one thermoplastic resin and is opaque or transparently colored, and the embossed pattern is less opaque or transparently colored with outlines that are more opaque or transparently colored.

In another embodiment of the invention the facestock of the embossed thermoplastic label includes a first layer having an upper surface and a lower surface with at least one thermoplastic resin. A second layer has an upper surface and a lower surface with at least one thermoplastic resin. A third layer has an upper surface and a lower surface with at least one thermoplastic resin. The first layer, second layer and third layer are different from each other. The upper surface of the second layer underlies the lower surface of the first layer. The upper surface of the third layer underlies the lower surface of the second layer. Each of the at least one thermoplastic resins of the first layer and the second layer has a Vicat softening point that is at least 20° C. lower than the Vicat softening point of the at least one thermoplastic resin of the third layer. The at least one embossed pattern is on the upper surface of the first layer. The first layer has a polyolefin and is clear or transparently colored. The second layer has a polyolefin and is opaque or transparently colored.

Another embodiment of the invention provides the facestock of the embossed thermoplastic label having a first layer with an upper surface and a lower surface with at least one thermoplastic resin; A second layer has an upper surface and a lower surface with at least one thermoplastic resin. A third layer has an upper surface and a lower surface with at least one thermoplastic resin. The first layer, second layer and third layer are different from each other. The upper surface of the second layer underlies the lower surface of the first layer and the upper surface of the third layer underlies the lower surface of the second layer, with each of the at least one thermoplastic resins of the first layer and the second layer having a Vicat softening point that is at least 20° C. lower than the Vicat softening point of the at least one thermoplastic resin of the third layer. In one embodiment, the at least one embossed pattern is on the upper surface of the first layer, and the at least one thermoplastic resin of the second layer has a Vicat softening point that is at least 10° C. lower than the Vicat softening point of the at least one thermoplastic resin of the first layer.

In an embodiment of the invention a method for embossing a thermoplastic label includes the steps of initially (a) providing (i) a facestock having an upper surface and a lower surface with at least one layer where the layer comprises at least one thermoplastic resin; (ii) an adhesive layer with an upper surface and a lower surface and having at least one adhesive where the upper surface of the adhesive layer is adhesively joined to the lower surface of the facestock; and (iii) a release liner having an upper surface and a lower surface with the upper surface of the release liner being releasably joined to the lower surface of the adhesive layer. Next, (b) embossing the upper surface of the facestock after the adhesive layer has been joined to the facestock and the release liner has been joined to the adhesive layer so that the embossed pattern includes at least one embossed section and at least one unembossed section on the facestock.

In another embodiment of the invention a method for embossing a thermoplastic label is provided and includes the steps of (a) providing a multilayered facestock having a first layer with an upper surface and a lower surface with at least one thermoplastic resin, and a second layer having an upper surface and a lower surface with at least one thermoplastic resin. The upper surface of the second layer underlies the lower surface of the first layer, and the at least one thermoplastic resin of the first layer has a Vicat softening point that is at least 20° C. lower than the Vicat softening point of the at least one thermoplastic resin of the second layer. Next, (b) embossing the upper surface of the first layer by applying heat to the lower surface of the second layer prior to or during the embossing of the first layer.

In a still further embodiment of the invention a method for applying an embossed thermoplastic label to a surface is provided and includes the steps of, initially (a) providing a surface and a label comprising (i) a facestock having an upper surface and a lower surface with at least one layer where the layer includes at least one thermoplastic resin, (ii) an adhesive layer having an upper surface and a lower surface with at least one adhesive where the upper surface of the adhesive layer is adhesively joined to the lower surface of the facestock, and (iii) a release liner having an upper surface and a lower surface where the upper surface of the release liner is releasably joined to the lower surface of the adhesive layer. Next (b) embossing the upper surface of the facestock after the adhesive layer has been joined to the facestock and the release liner has been joined to the adhesive layer so that the embossed pattern includes at least one embossed section and at least one unembossed section on the facestock. The adhesive layer of the at least one embossed section is thinner than the adhesive layer of the unembossed section. Then, (c) removing the release liner and applying the adhesive layer against the surface, thereby entrapping air in the at least one embossed section between the adhesive layer and the surface.

Other features of the invention will become apparent from the following description of the embodiments taken in conjunction with the accompanying drawings which illustrate, by way of example, the principles of the present invention.

BRIEF DESCRIPTION OF THE DRAWINGS

The appended drawings are provided to illustrate and not limit the present invention. The components in the drawings are not to scale with emphasis instead to illustrating the principles of the invention.

DETAILED DESCRIPTION OF THE EMBODIMENTS

A label, as used herein, includes any label, intermediate, laminate, or adherent or adhesive article (whether pressure sensitive or activatable) or combinations thereof which can be applied to a surface.

An intermediate is defined as a label which has not undergone all processing steps to be considered a complete design. Provided another way, an intermediate requires one or more additional processing steps before reaching a finished product stage. For example, an intermediate can be a precursor to a label without a print layer. Multiple intermediates can be used in creating a finished product.

Figure 1:
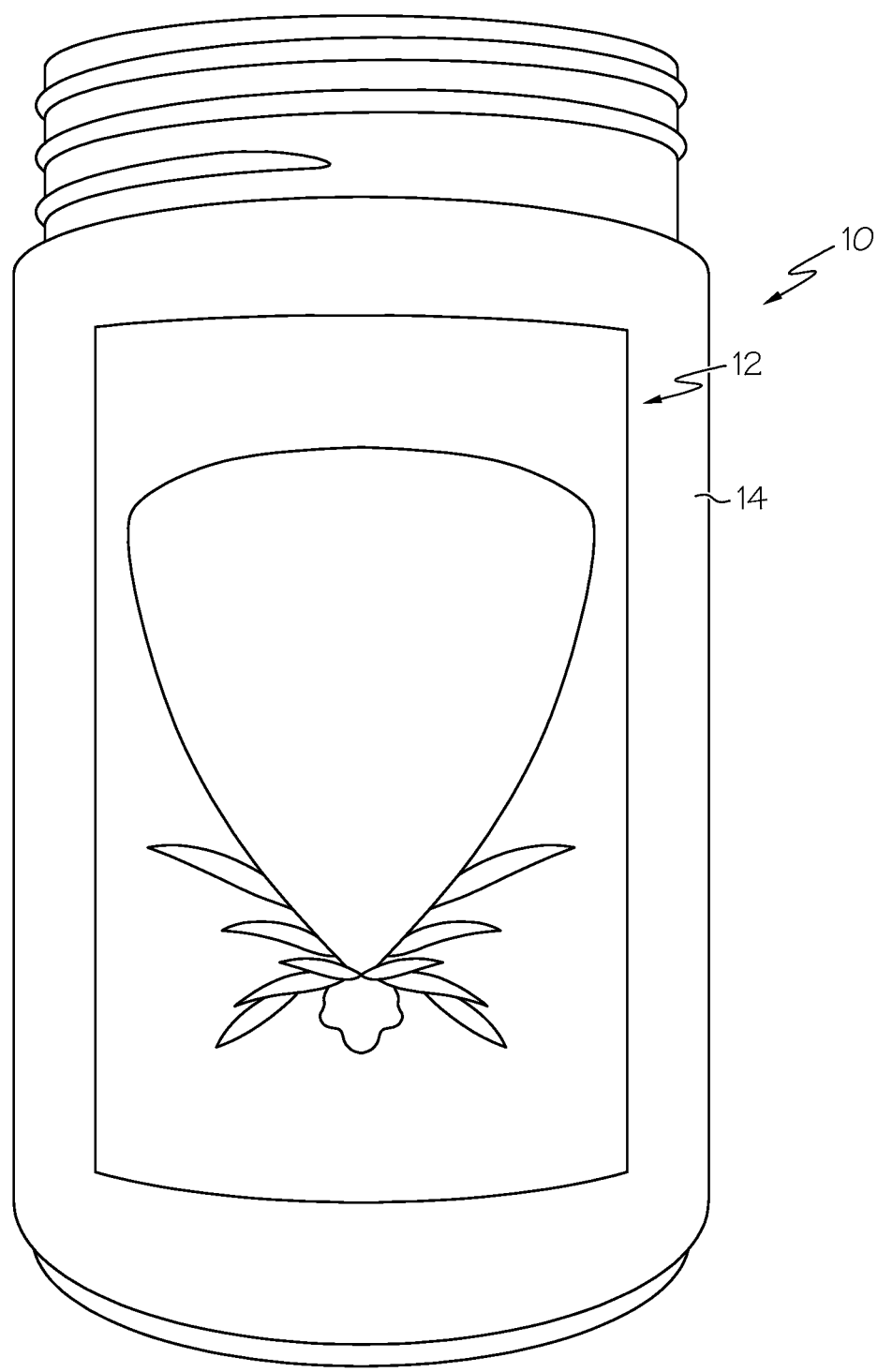
FIG. 1 is a front view of a fluid container incorporating a label according to aspects of the present disclosure.

FIG. 1 shows a container 10 having a substantially un-textured sidewall or surface 12. Attached to the surface 12 is a label 14, which gives the un-textured surface 12 the appearance of being embossed or having raised features, as will be described in greater detail below. While FIG. 1 shows the label 12 applied to a container 10, the discussion which follows is applicable to other surfaces, particularly un-textured surfaces, and the present disclosure is not limited to containers, but includes packages, vessels, boxes, and the like.

Figure 2:
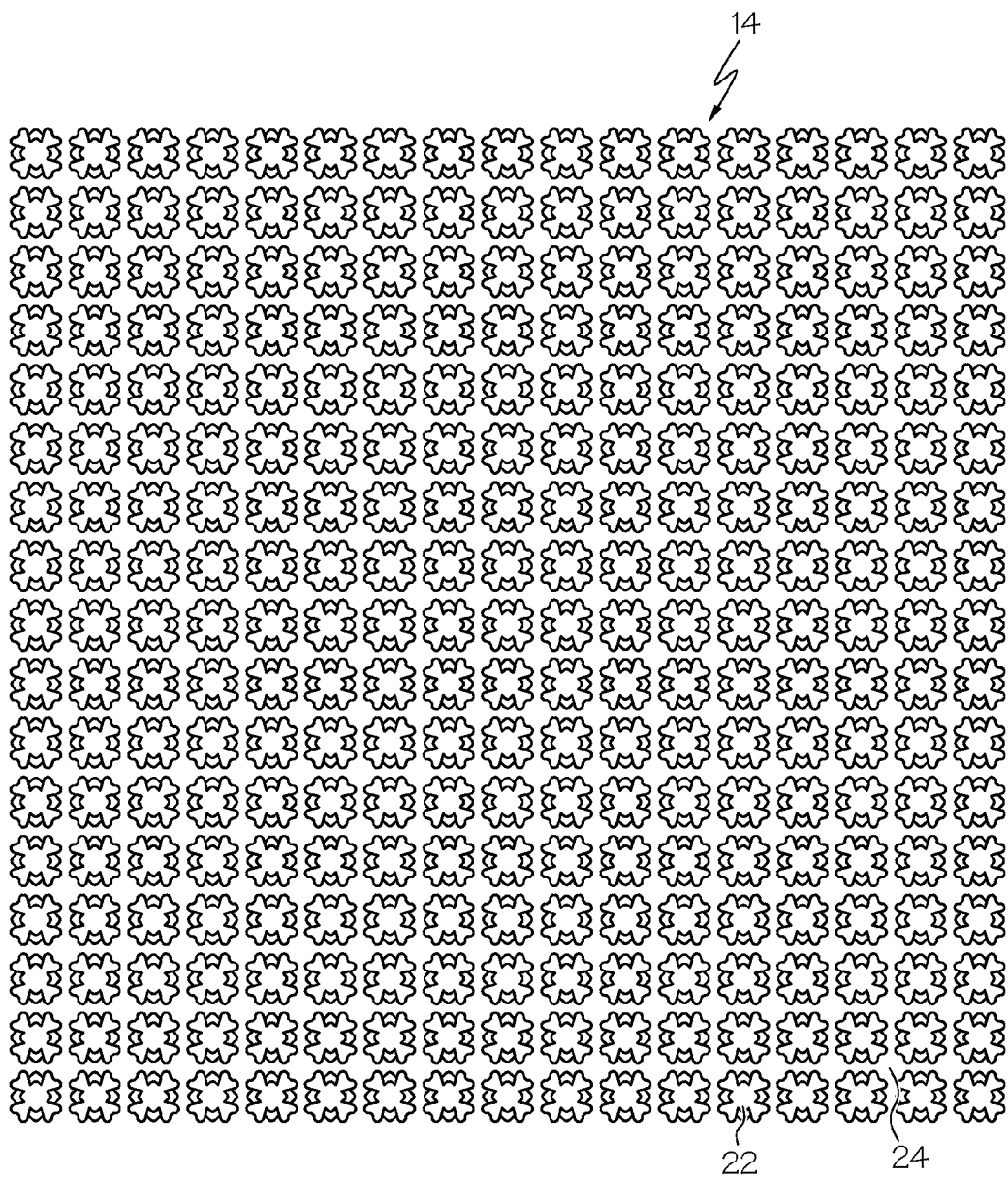
FIG. 2 is a top plan view of the label of FIG. 1.
Figure 3:
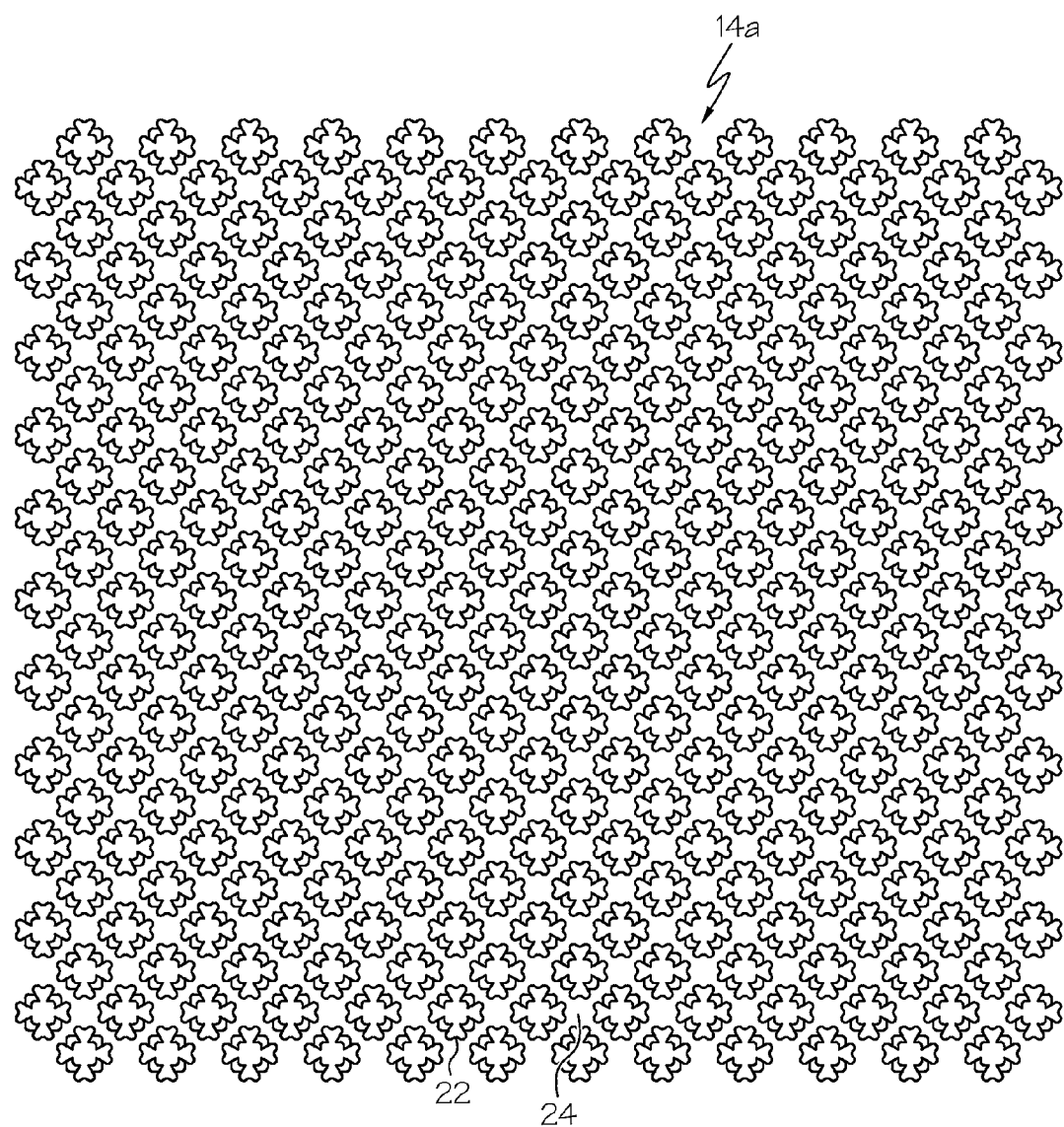
FIGS. 3 and 4 are top plan views of alternative labels.
Figure 4:
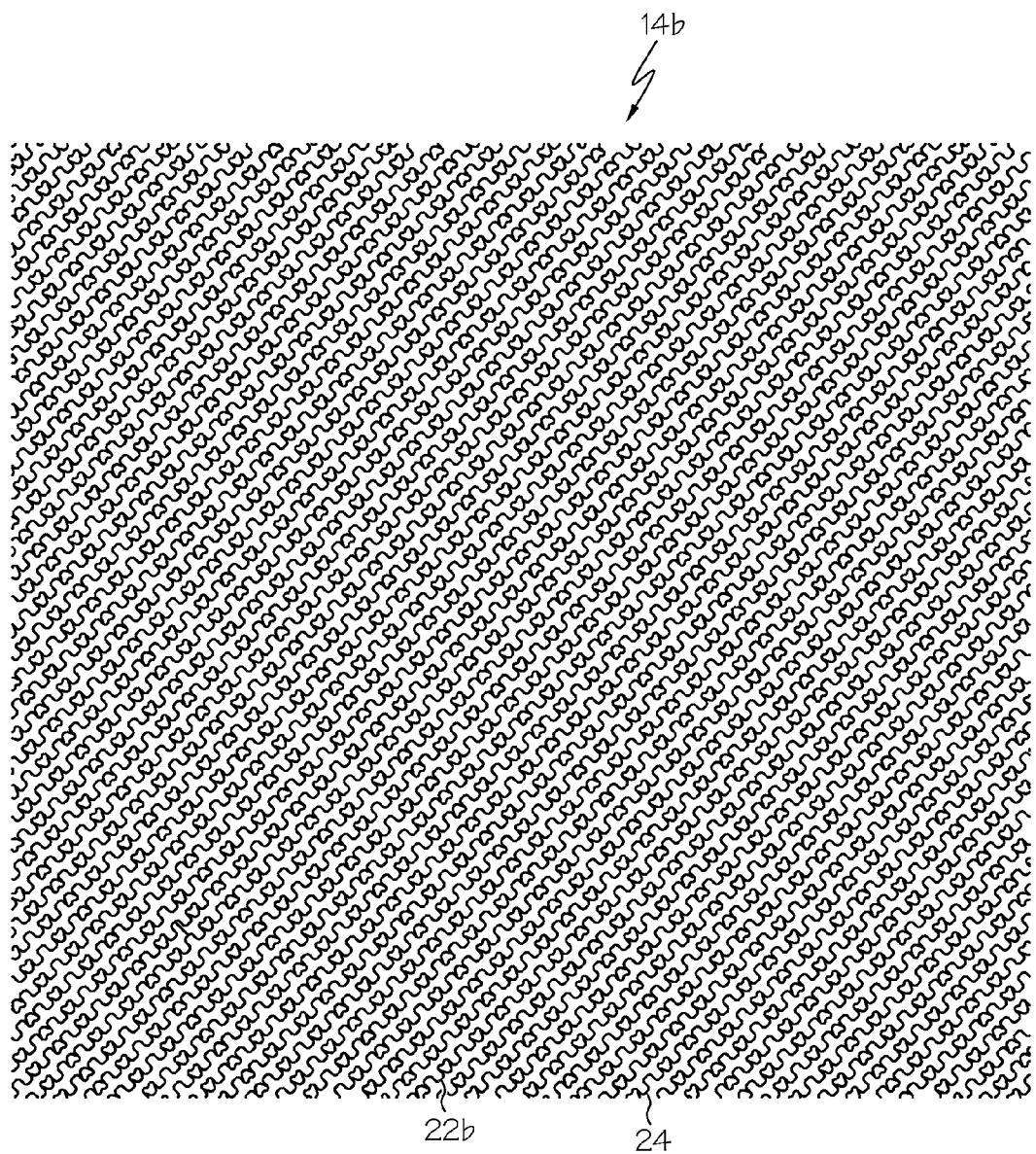

The label 14 is illustrated in greater detail in FIG. 2 in an unattached condition. The label 14 of FIGS. 1 and 2 is merely exemplary, and differently configured labels may also be employed without departing from the scope of the present disclosure. For example, FIGS. 3 and 4 illustrate labels 14a and 14b having alternative embossed patterns. In the embodiment of FIGS. 1 and 2, the label 14 is provided with repeating embossed sections 22 in a "snowflake" or crystal like pattern. In the embodiment of FIG. 3, the label 14a is provided with repeating embossed sections 22a in a modified "snowflake" pattern. In the embodiment of FIG. 4, the label 14b is provided with repeating embossed sections 22b in a more linear pattern. Other patterns include "shell" and "lightbulb" configurations. Other configurations of the embossed sections may also be employed without departing from the scope of the present disclosure.

Figure 5:
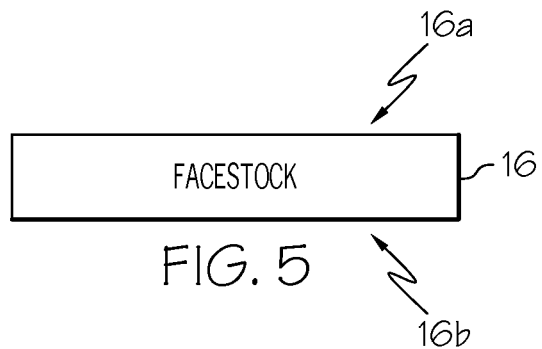
FIG. 5 is a cross sectional view of an intermediate of the current invention.

FIG. 5 shows an embodiment of the current invention in which an intermediate label construction comprises: (a) a facestock 16 having an upper surface 16a and a lower surface 16b and comprising at least one layer wherein the layer includes at least one thermoplastic resin and (b) wherein the facestock comprises at least one embossed pattern on the upper surface 16a of the facestock and wherein the embossed pattern includes at least one embossed section and at least one unembossed section on the facestock.

Figure 6:
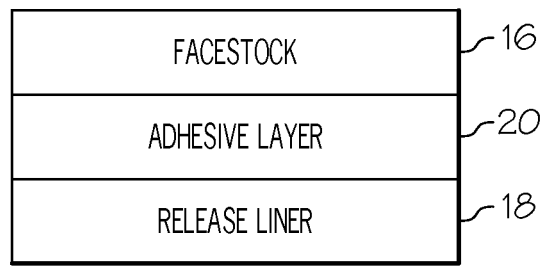
FIG. 6 is a cross-sectional view of a thermoplastic label according to an embodiment of the invention.

An embossed thermoplastic label, as depicted in FIG. 6, comprises a facestock 16 having an upper surface and a lower surface where the facestock comprises at least one embossed pattern on the upper surface of the facestock, an adhesive layer 20 having an upper surface and a lower surface where the upper surface of the adhesive layer is adhesively joined to the lower surface of the facestock, and a release liner 18 having an upper surface and a lower surface where the upper surface of the release liner is releasably joined to the lower surface of the adhesive layer. In an embodiment of the invention the embossed pattern is formed in the facestock 16 after the adhesive layer 20 has been joined to the facestock and the release liner 18 has been joined to the adhesive layer.

Figure 7:
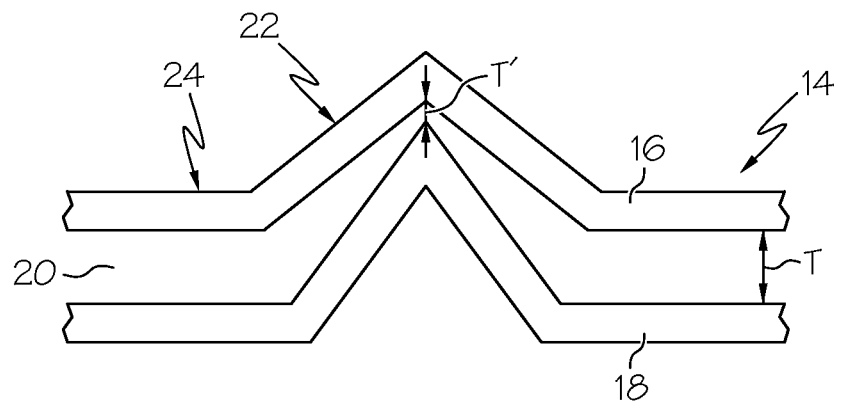
FIG. 7 is a cross-sectional view of a label according to the present disclosure.

FIG. 7 shows an exemplary embodiment of the current invention. The label 14 includes a facestock 16, a liner layer 18, and an adhesive layer 20 intermediate the facestock 16 and the release liner I 18. The label 14 and each individual layer as manufactured may be substantially flat or planar and subsequently treated to include at least one embossed section 22 and at least one un-embossed section 24. As shown in FIG. 7, the thickness T of the adhesive layer 20 is greater in the un-embossed section 24 than the thickness T' of the adhesive layer 20 in the embossed section 22. Depending on a variety of factors (e.g., the material composition of the label 14, the temperature and pressure at which the embossing process is carried out), the adhesive layer 20 may thin out to nearly nothing in the embossed section 22.

Facestock

The embossed thermoplastic label comprises a facestock having an upper surface and a lower surface and comprising at least one layer that contains at least one thermoplastic resin. The facestock also contains at least one embossed pattern on the upper surface of the facestock. In another embodiment of this invention the facestock also includes at least one print layer. In embodiments of the invention the facestock is monolayered or the facestock is multilayered comprising two or more layers which are different from each other.

A multilayered facestock may include at least one adhesive layer. In a facestock containing three layers, the adhesive layer is preferably the second layer, but may be positioned elsewhere in the construction depending on the final design of the product.

The facestock can be prepared by any of the methods which results in a thermoplastic film to include extrusion to form a monolayered film, coextrusion to form a multilayered film, lamination to form a multilayered film, or a combination of two or more of the any of the foregoing methods. In an embodiment of the invention the facestock is formed by laminating two or more previously formed layers using a means selected from the group consisting of pressure, heat, an adhesive, and a combination of two or more of any of the foregoing means. In an embodiment of the invention the facestock is formed by laminating a first film onto a second film where the first film is extrusion or coextrusion coated onto the second film. Both the first film and second films can be monolayered or multilayered.

The layer(s) of the facestock comprise(s) at least one thermoplastic resin. The at least one thermoplastic resin can be a polyolefin, an alkene-unsaturated carboxylic acid or unsaturated carboxylic acid derivative copolymer, a styrene-based homopolymer or copolymer, a polyurethane, a poly (vinyl chloride), a polycarbonate, a polyamide, a polymethacrylate or polyacrylate, a fluoropolymer, a polyester, or a mixture of two or more of any of the foregoing thermoplastic resins.

The polyolefin may also comprise a polyethylene, a polypropylene, or a mixture of the two polymers. The polyethylene may consist of a polyethylene homopolymer, a polyethylene copolymer, or a mixture of two or more of any of the foregoing polyethylene polymers. The polyethylene homopolymers and copolymers can comprise polymers prepared from free radical or Ziegler-Natta (Z-N) or metallocene polymerization catalysts, having an ASTM D1238 melt index at 190° C./2.16 kg of 1 to 40 g/10 minutes, and having an ASTM D792 density of 0.85 to 0.98 g/cm$^3$. The polyethylene homopolymers and copolymers may comprise a high density polyethylene, a medium density polyethylene, a linear low density polyethylene, a low density polyethylene, a very low density polyethylene, a polyethylene plastomer, or a mixture of two or more of any of the foregoing polyethylenes. The polypropylene can comprise a polypropylene homopolymer, a polypropylene copolymer, or a mixture of two or more of any of the foregoing polypropylene polymers. The polypropylene homopolymers and copolymers may comprise polymers prepared from Z-N or metallocene polymerization catalysts, having an ASTM D1238 melt flow rate at 230° C./2.16 kg of 1 to 40 g/10 minutes, and having an ASTM D792 density of 0.87 to 0.92 g/cm$^3$. The polypropylene copolymers comprise copolymers of propylene with up to 20% by weight of other alpha-olefins having 2 to 20 carbon atoms. In an embodiment of the invention the polypropylene copolymer comprises a random copolymer, a block copolymer, or a mixture of two or more of any of the foregoing copolymers. In an embodiment of the invention the polyester comprises a polyester prepared from an aromatic polycarboxylic acid having two or more carboxylic acid groups and a polyol having two or more hydroxyl groups, having an ASTM D792 density of 1.27 to 1.35 g/cm$^3$, and having a melting point as measured by differential scanning calorimetry of 230 to 280° C. Useful polyesters include poly(ethylene terephthalate) resins, poly(butylene terephthalate) resins, and poly(ethylene 2,6-naphthalenedicarboxylate) resins. The thermoplastic resins or films of the thermoplastic resins are available from resin and film suppliers to include Dow Chemical, Exxon-Mobil Chemical, Flint Hills Resources, Eastman Chemical, Mitsubishi Polyester Film, and Schoeller Tech Papers.

At least one layer of the facestock may contain at least one additive. The at least one layer of the facestock may contain 0.0005 to 90% by weight of at least one additive.

Various types of additives include nucleating agent, an antiblock agent, a processing aid, a slip agent, an antistatic agent, a pigment, a cavitating agent, an inorganic filler, an antioxidant, a heat stabilizer, a flame retardant, an acid acceptor, a visible and/or ultraviolet light stabilizer, or a mixture of two or more of any of the foregoing additives. The at least one additive can be introduced into a facestock during formation of the facestock as a component of a thermoplastic resin obtained from a thermoplastic resin supplier or by way of an additive concentrate obtained from an additive concentrate supplier where the additive concentrate comprises one or more additives in a thermoplastic resin matrix.

Pigments include any substance that imparts color to another substance such as a facestock. Pigments comprise inorganic pigments, organic pigments, or mixtures of two or more of any of the foregoing pigments. Inorganic pigments comprise metallic oxides such as titanium dioxide and ferric oxide, metal powders, carbon black, or mixtures of two or more of any of the foregoing inorganic pigments. Organic pigments comprise natural organic pigments derived from animal and plant sources such as indigo, synthetic organic pigments such as synthetic indigo blue, or mixtures of two or more of any of the foregoing organic pigments.

Various visual characteristics are possible in the different facestock layers. A facestock, for instance, may include multiple layers with each layer having a different opacity or thickness. For example, at least one layer of the facestock is selected from the group consisting of clear, clear and colored, and opaque and colored. In embodiments of the invention wherein the facestock is multilayered each layer may have a visual characteristic selected from the group consisting of clear, clear and colored, and opaque and colored. A clear or clear and colored layer may have a TAPPI T425 opacity of 10% or less, 8% or less, or 5% or less. A clear or clear and colored layer may also have an ASTM D1003 haze of 10% or less, 8% or less, or 5% or less. Opaque and colored layer may have a TAPPI T425 opacity that is greater than 70%, 80%, or 90%.

The facestock layer(s) may be metalized with a metal. Metalizing the layer(s) of the facestock of the embossed thermoplastic label with a metal, such as aluminum which is reflective, can provide the label with a holographic image. Metallization of the at least one layer of the facestock includes coating the layer with a metal or combining the layer with a metal foil.

The embossed thermoplastic label may comprise at least one taggant. A taggant is any substance that can be added to a facestock or an adhesive layer of the label, such as an ink or a microscopic colored material generally undetectable to the human eye which indicates the source of manufacture for security or anti-counterfeiting purposes. A taggant can also be materials that are only visible under special lighting or environmental conditions such as a UV visible or thermochromic dye or pigment.

The layer or layers of the facestock are oriented or nonoriented. Orienting a layer or layers of the facestock involves stretching the layer or layers uniaxially in the machine direction or transverse direction, or biaxially in both the machine direction and transverse direction. The machine direction is the direction that a layer or layers of the facestock is or are advanced during its or their formation. The transverse direction is the direction that is orthogonal or perpendicular to the machine direction. The layer or layers of the facestock can be stretched uniaxially or biaxially in the machine and/or transverse directions in a stretch ratio range of 2 to 12, 3 to 10, or 4 to 8 where the stretch ratio is the ratio of a layer's length after stretching to the layer's length before stretching. The stretching of the layer or layers of the facestock is usually done at an elevated temperature near the softening temperature of the thermoplastic resin or resins contained in the layer or layers. The oriented layer or layers of the facestock can be annealed or heat set to provide dimensional stability so that the layer or layers do not shrink or distort appreciably when exposed to elevated temperatures during any additional processing or end use service life. The layer or layers of the facestock may have an ASTM D1204 linear shrinkage at 100° C. in the machine direction and the transverse direction of less than 5%, less than 4%, or less than 3%. When the facestock is multilayered one or more layers may be oriented. A multilayered facestock may not have any oriented layers. Orienting a layer or layers of the facestock increases layer stiffness, as measured by ASTM D882 tensile modulus, in the stretching direction or directions which can be beneficial in terms of subsequent processing of the facestock and derivative label to include label dispensability during labeling of a container.

A treatment layer may be added to at least one surface of the facestock. Treatment layers may include anchor coatings or tie layers as is necessary or desirable with respect to a particular arrangement. The facestock layer(s) may be treated on the upper surface, the lower surface, an internal surface where the facestock is multilayered, and a combination of two or more of any of the foregoing surfaces to enhance performance. Performance enhancement of a surface of a layer or layers of a facestock can include abrasion resistance, moisture resistance, adhesion of a printing ink, adhesion of an adhesive, or a combination of two or more of any of the foregoing enhancements. The facestock may be treated on a surface by a corona discharge treatment, a flame treatment, a plasma treatment, a topcoat treatment, or a combination of two or more of any of the foregoing treatments.

The facestock may have a thickness of 254 micrometers (10 mils) or less, 127 micrometers (5 mils) or less, 101.6 micrometers (4 mils) or less, or 76.2 micrometers (3 mils) or less. In embodiments of the invention the facestock has a thickness ranging from 12.7 to 127 micrometers (0.5 to 5 mils), 19.1 to 101.6 micrometers (0.75 to 4 mils), or 25.4 to 76.2 micrometers (1 to 3 mils). When the facestock has two or more layers, the layers can vary in thickness relative to each other as needed for a given application. Each of the two or more layers of the multilayered facestock layers may range in thickness from 1 to 99%, 5 to 95%, or 10 to 90% of the thickness of the facestock.

Adhesive Layer

The embossed thermoplastic label may comprise an adhesive layer which may include at least one type of adhesive. The adhesive may be an ultraviolet cured adhesive. The at least one adhesive may also comprise a pressure sensitive adhesive. The pressure sensitive adhesive may be a hot melt adhesive, a solvent adhesive, or an emulsion adhesive. The pressure sensitive adhesive may comprise a styrene block copolymer based hot melt adhesive or an acrylic based emulsion adhesive to include copolymers of acrylic acid esters and optionally acrylic acid. The adhesive layer can be directly coated on the lower surface of the facestock or the adhesive layer can be directly coated on the upper surface of release liner and then adhesively joined to the lower surface of the facestock. Additionally, an adhesive layer may be present as a layer of the facestock.

A label described in any of the embodiments may have an adhesive layer where the adhesive layer is thinner at an embossed section than at an un-embossed section. This feature is applicable to the adhesive layer when the adhesive layer is either considered a layer of the facestock or a separate layer of the label. The embossed section of the adhesive may be at least 20% thinner than the unembossed section of adhesive. Additionally, the embossed section of the adhesive may be up to 50% thinner or 90% thinner than the unembossed section of the adhesive.

The adhesive layer can vary in coating weight as needed for a given application. The adhesive layer may range on a dry weight coating basis from 5 to 40 $g/m^2$, 8 to 35 $g/m^2$, or 10 to 30 $g/m^2$. The adhesives are available from adhesive suppliers to include BASF, Rohm & Haas, Synthomer, and Cytec.

Release Liner

The embossed thermoplastic layer may also comprise a release liner. The release liner may be monolayered or multilayered. A monolayered release liner may comprise a paper based layer or polymeric based layer. A multilayered release liner may have two or more layers selected from the group including a paper based layer, a polymeric based layer, and combinations of two or more of any of the foregoing layers. The polymeric based layer may include a thermoplastic resin such as a polyolefin, a polyester, or a mixture of the two.

The release liner normally comprises a release coating on the upper surface of the release liner which is releasably joined to the lower surface of the adhesive layer. The release coating can comprise any coating that allows the release liner to be removed from the adhesive layer during the labeling process without damaging the adhesive. It is preferable that the release liner is constituted such that it can be subjected to the embossing process without being damaged. The release coating may comprise an organosiloxane polymer. The release liner can vary in thickness as needed for a given application. In an embodiment the release liner ranges in thickness from 12.7 to 101.6 micrometers (0.5 to 4 mils).

Release liners are available from release liner suppliers to include Huhtamaki and International Paper.

Embossed Thermoplastic Label Construction and Processing

The thermoplastic label of the present invention can be embossed by any suitable embossing processes. Several embossing techniques are described in U.S. Pat. No. 3,950,480. The thermoplastic label can be embossed on a heat laminator using an engraved flexographic blanket having an embossing pattern or on an embosser using an embossing roll.

In addition to flexographic blankets, the roll or blanket used for the image design may be any material used for embossing or flexographic printing. These include rubber surfaced embossing or flexographic rolls such as silicone, nitrile, butyl, viton etc. or photopolymer flexographic rolls or plates. The rolls can also be engraved metal or ceramic rolls.

The embossed pattern may be formed in the facestock 16 before the adhesive layer 20 has been joined to the facestock and the release liner 5 has been joined to the adhesive layer. Alternatively, the embossed thermoplastic label may be embossed after the adhesive layer and release liner have been joined to the label, as described above, where the release liner comprises at least one layer and where the layer comprises at least one thermoplastic resin. The thermoplastic resin may be a polyester resin. The embossed thermoplastic label may be embossed after the adhesive layer and release liner have been joined to the label, as described above, where the facestock is multilayered and includes at least two layers wherein each of the layers has at least one thermoplastic resin and is different from the other layer or layers.

A container or surface may be labeled with the embossed thermoplastic label which has been embossed after the adhesive layer and release liner have been joined to the label, as described above, where the lower surface of the adhesive layer is adhesively joined to an outside surface of the container and the container has an embossed appearance. The container or surface can be composed of number of materials, including glass, polyethylene terephthalate (PET), High-density polyethylene (HDPE), and metal. The container or surface can also be a variety of shapes. The container may have an embossed appearance, as described above, where the container is a cylindrically shaped glass bottle.

It is believed that embossing the upper surface of the facestock, under conditions of heat and pressure, to form an embossed pattern on the upper surface when the facestock is combined with the adhesive layer and release liner results in embossing of the adhesive layer. When the release liner is removed from the embossed thermoplastic label and the label is adhesively joined to an outside surface of a container having a flat or regular surface that is free of compound curves or essentially free of compound curves, such as a cylindrically shaped glass bottle, air can be trapped in the thinned embossed part of the adhesive making a raised surface above the trapped air in the shape of the embossed pattern which provides contrast at the air-adhesive interface resulting in an embossed appearance where the container itself appears to have been embossed and the unembossed portions of the adhesive wet out on the container and are nearly invisible.

One method for embossing a thermoplastic label comprises embossing the upper surface of the facestock after the adhesive layer has been joined to the facestock and the release liner has been joined to the adhesive layer.

Figure 8:
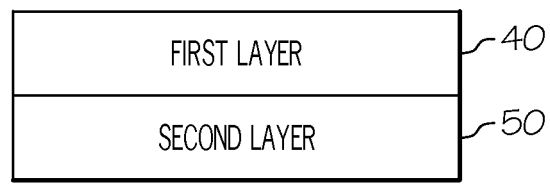
FIG. 8 is a cross-sectional view of a facestock having two layers according to an embodiment of the invention.

As depicted in FIG. 8, an embossed thermoplastic label comprises a first layer 40 having an upper surface and a lower surface and a second layer 50 having an upper surface and a lower surface. Each layer includes at least one thermoplastic resin. The upper surface of the first layer contains at least one embossed pattern. The upper surface of the second layer underlies the lower surface of the first layer. The at least one thermoplastic resin of the first layer has a Vicat softening point that is at least 20° C. lower than the Vicat softening point of the at least one thermoplastic resin of the second layer, and the at least one embossed pattern is on the upper surface of the first layer. The term "underlies" includes that when a lower layer underlies an upper layer that the lower layer can be in direct contact with the upper layer or that one or more intermediate layers can be between the lower layer and the upper layer.

The one or more intermediate layers can include a tie layer which can improve adhesion of layers of the facestock to each other. The one or more intermediate layers may also include an adhesive laminate layer when formation of a multilayered facestock involves lamination. A thermoplastic resin based filmic layer to provide label processing or end use performance may also be an intermediate layer or layers. Additionally, a combination of two or more of any of the foregoing intermediate layers may be present.

The at least one thermoplastic resin of the first layer 40 may have a Vicat softening point that is at least 20° C., at least 30° C., at least 40° C., or at least 70° C. lower than the Vicat softening point of the at least one thermoplastic resin of the second layer 50. The Vicat softening point is a measure of the heat resistance of a thermoplastic resin where heat resistance is directly proportional to the Vicat softening point. The Vicat softening point can be measured by a standard method selected from the group consisting of ASTM D1525, ISO 306, and DIN 53460. When a first thermoplastic resin has a higher Vicat softening point than a second thermoplastic resin, the first thermoplastic resin also has more heat resistance than the second thermoplastic resin.

The at least one thermoplastic resin of the first layer 40 may comprise a polyolefin, and the at least one thermoplastic resin of the second layer 50 may comprise a thermoplastic resin selected from the group consisting of a polyester, a polyamide, a polycarbonate, and a mixture of two or more of any of the foregoing thermoplastic resins. Table I lists Vicat softening points of various thermoplastic resins which are useful for the embossed thermoplastic label of this invention.

TABLE I

Thermoplastic Resin Vicat Softening Points[1]

| Thermoplastic Resin | Vicat Softening Point, °C.[2] |
|---|---|
| High Density Polyethylene | 65 |
| Polypropylene | 90 |
| Polystyrene | 90 |
| Poly(vinyl chloride) | 92 |
| Poly(methyl methacrylate) | 85 |
| Polycarbonate | 138 |
| Polyamide 6 | 180 |
| Polyamide 6,6 | 200 |
| Poly(butylene terephthalate) | 180 |
| Poly(ethylene terephthalate) | 190 |

[1]Source - Design Data for Plastics Engineers, Rao and O'Brien, Hanser and Gardner Publications, © 1998
[2]Vicat softening point was measured by DIN 53460 at 5 kg.

Figure 9:
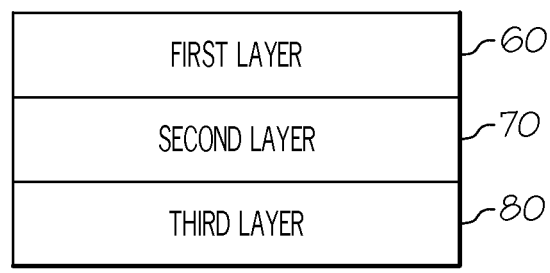
FIG. 9 is a cross-sectional view of a facestock having three layers according to an embodiment of the invention.

As depicted in FIG. 9, the embossed thermoplastic label may comprise a facestock having an upper surface and a lower surface where the facestock comprises at least one embossed pattern on the upper surface of the facestock and where the facestock comprises a first layer 60 having an upper surface and a lower surface and comprising at least one thermoplastic resin, a second layer 70 having an upper surface and a lower surface and comprising at least one thermoplastic resin, and a third layer 80 having an upper surface and a lower surface and including at least one thermoplastic resin, where the first layer and second layer and third layer are different from each other, the upper surface of the second layer underlies the lower surface of the first layer, the upper surface of the third layer underlies the lower surface of the second layer, each of the at least one thermoplastic resins of the first layer and the second layer has a Vicat softening point that is at least 20° C. lower than the Vicat softening point of the at least one thermoplastic resin of the third layer, and the at least one embossed pattern is on the upper surface of the first layer. Each of the at least one thermoplastic resins of the first layer 60 and the second layer 70 may have a Vicat softening point that is at least 20° C., at least 30° C., at least 40° C., or at least 70° C. lower than the Vicat softening point of the at least one thermoplastic resin of the third layer 80.

As depicted in FIG. 9 and described above, a first layer 60 of the facestock may comprise a polyolefin and is clear or transparently colored, the second layer 70 of the facestock may comprise a polyolefin and is opaque or transparently colored, and the embossed pattern is less opaque or transparently colored with outlines that are more opaque or transparently colored. Additionally, the first layer 60 may comprise a polyethylene and is clear or transparently colored, the second layer 70 may comprise a polyethylene and is opaque or transparently colored, the third layer 80 may include a polyester, and the embossed pattern is less opaque or transparently colored with outlines that are more opaque or transparently colored. Alternatively, the embossed thermoplastic label includes a facestock, as depicted in FIG. 9 and described above, where the first layer 60 has a polyolefin and is clear or transparently colored, the second layer 70 includes a polyolefin and is opaque or transparently colored, the thickness of the first layer is less than the thickness of the second layer, and the embossed pattern is less opaque or transparently colored with outlines that are more opaque or transparently colored. The outlines may be opaque or transparently colored having a TAPPI T425 opacity that is less than 90%, 80%, or 70%. The embossed thermoplastic label may have an embossed pattern that is less opaque or transparently colored with outlines that are more opaque or transparently colored, as described above, and where the thickness of the first layer 70 is less than the thickness of the second layer 80 and ranges in thickness from 2.5 to 76.2 micrometers (0.1 to 3 mils), 3.8 to 50.8 micrometers (0.15 to 2 mils), or 5.1 to 25.4 micrometers (0.2 to 1 mils).

The embossed thermoplastic label may have a facestock, as depicted in FIG. 9 and described above, where the at least one thermoplastic resin of the second layer 70 has a Vicat softening point that is at least 10° C., at least 20° C., or at least 35° C. lower than the Vicat softening point of the at least one thermoplastic resin of the first layer 60. Additionally, the first layer may include a polypropylene, the second layer may include a polyethylene, and the third layer 80 may have a polyester. In an embodiment of the invention the embossed thermoplastic label comprises a facestock, as depicted in FIG. 9 and described above, where the at least one thermoplastic resin of the second layer 70 has a Vicat softening point that is at least 10° C. lower than the Vicat softening point of the at least one thermoplastic resin of the first layer 60, and the second layer has a visual characteristic selected from the group consisting of clear, clear and colored, or opaque and colored. It is believed that embossing the upper surface of the first layer 60 of the facestock, as depicted in FIG. 9 and described above, under conditions of heat and pressure, to form an embossed pattern on the upper surface of the first layer may result in embossing of the second layer 70 when the second layer has a lower Vicat softening point than the Vicat softening point of the first layer where this embossing of the second layer enhances the visual effect of the embossed thermoplastic label.

Figure 10:
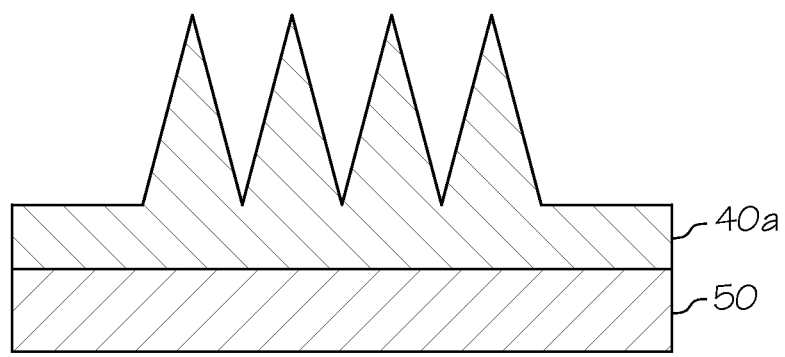
FIG. 10 is a cross-sectional view of a facestock having two layers after being embossed according to an embodiment of the invention.

Embossing the first layer 40 of the facestock may also result in only embossing the first layer. FIG. 10 shows an embossed facestock in which first layer 40a has been embossed and second layer 50 remains unembossed.

Figure 11:
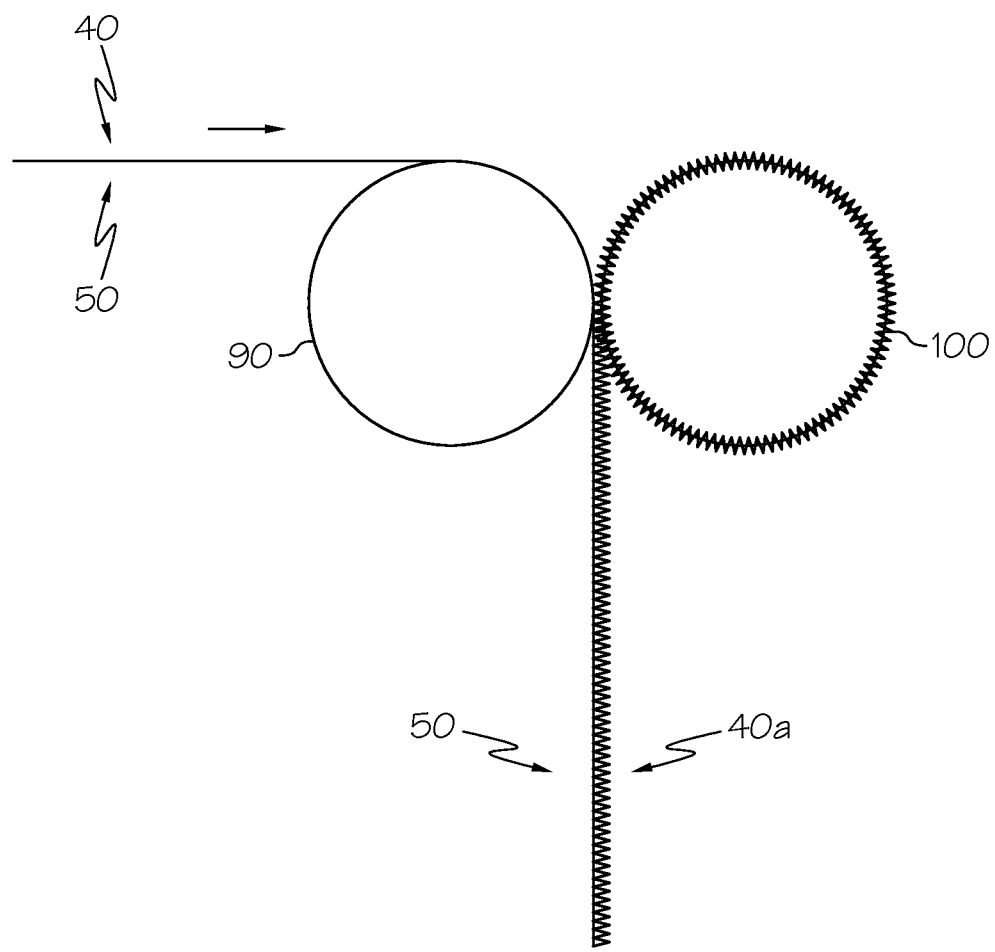
FIG. 11 is a view of an embossing process according to an embodiment of the invention.

FIG. 11 shows an example of a simplified embossing process of the current invention in which only the first layer of the facestock in is embossed. A facestock with first layer 40 and second layer 50 is embossed by running the facestock through the nip provided by backing roll 90 and embossing roll 100 while applying heat and pressure. This produces an example of the embossed facestock of FIG. 10 consisting of layers 40a and 50.

Figure 12:
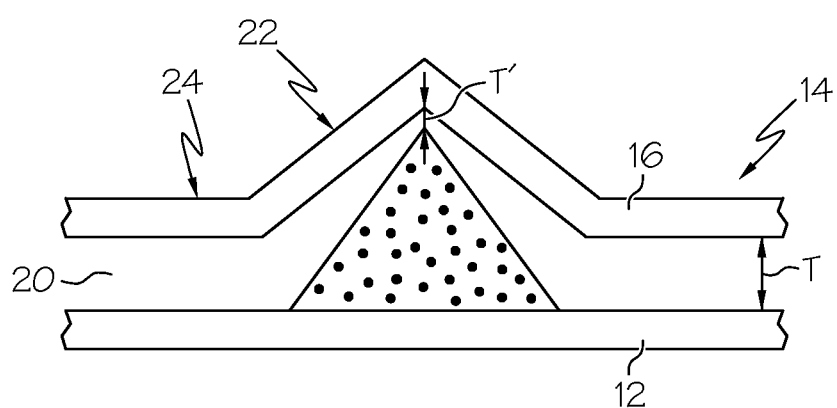
FIG. 12 is a cross-sectional view of the label as applied to a surface.

FIG. 12 shows an embodiment of the current invention in which the thermoplastic label is applied to a surface. To apply the label 14 to a surface 12, the liner layer 18 is removed from the adhesive layer 20 and then the adhesive layer 20 is oriented toward the surface 12. The adhesive layer 20 is then applied against the surface 12, which entraps air 26 in the embossed section 22 between the adhesive layer 20 and the surface 12. The un-embossed section 24 will lay flat against the surface 12, while the embossed section 22 will project above or beyond the un-embossed section 24, thereby giving the appearance that the surface 12 is embossed or has raised features. In addition to the physical projection provided by the embossed section 22, the entrapped air 26 will distort light passing through the embossed section 22 to enhance the effect.

EXAMPLES

The following non-limiting examples further describe and illustrate the present invention.

Example 1

A clear thermoplastic label having a facestock/adhesive layer/release liner construction, as shown in FIG. 6, was embossed on the upper/outer surface of the facestock. When the release liner was removed and the facestock/adhesive layer combination was applied as a label to a cylindrically shaped glass bottle, the embossed thermoplastic label produced an embossed glass look and texture on the bottle.

Example 2

A clear thermoplastic label has a low density polyethylene (LDPE, thickness of 20.3 micrometers or 0.8 mils) first layer/poly(ethylene terephthalate) (PET, 400-16) second layer construction, as shown in FIG. 8, was prepared by extrusion coating of LDPE on PET, and was obtained from Schoeller Tech Papers. The LDPE/PET thermoplastic label was embossed on a HL-1000 heat laminator at 135° C. (275° F.) at 40.8 kg (90 pounds) at 6.1 meters (20 feet) per minute using a thermoplastic (polycarbonate construction) based blanket having a snowflake embossing pattern which replicated the snowflake pattern on the first layer of the label.

Example 3

A clear thermoplastic label has a high density polyethylene (HDPE, thickness of 25.4 micrometers or 1 mils) first layer/poly(ethylene terephthalate) (PET, 400-16) second layer construction, as shown in FIG. 8, was prepared by extrusion coating of HDPE on PET, and was obtained from Schoeller Tech Papers. The HDPE/PET thermoplastic label was embossed on a HL-1000 heat laminator at 146° C. (295° F.) at 40.8 kg (90 pounds) at 6.1 meters (20 feet) per minute using a thermoplastic (polycarbonate construction) based blanket having a snowflake embossing pattern which replicated the snowflake pattern on the first layer of the label.

Example 4

A clear thermoplastic label has a low density polyethylene (LDPE, thickness of 20.3 micrometers or 0.8 mils) first layer/poly(ethylene terephthalate) (PET, 400-16) second layer construction, as shown in FIG. 8, was prepared by extrusion coating of LDPE on PET, and was obtained from Schoeller Tech Papers. The LDPE/PET thermoplastic label was embossed on a lab embosser at 121° C. (250° F.) at 40.8 kg (90 pounds) at 6.1 meters (20 feet) per minute using an embossing roll having a shell embossing pattern which replicated the shell pattern on the first layer of the label.

Example 5

A white opaque thermoplastic label has a clear polypropylene first layer/white opaque low density polyethylene second layer/clear poly(ethylene terephthalate) third layer construction as shown in FIG. 9 where the first layer is relatively thin compared to the second layer. The thermoplastic label is embossed on a lab embosser using an embossing roll having an open shell embossing pattern which replicates the shell pattern on the second layer resulting in a series of white opaque shells with ridges and transparent outlines between the opaque shells.

Example 6

A clear thermoplastic label has a polypropylene first layer/low density polyethylene second layer/poly(ethylene terephthalate) third layer construction as shown in FIG. 9. The thermoplastic label is embossed with an embossing pattern which replicates the embossing pattern on the first layer of the label where the embossed pattern is visually enhanced.

Each of the documents referred to in the Detailed Description of the Embodiments is incorporated herein by reference. All numerical quantities in this application used in the Brief Summary of the Invention, Detailed Description of the Embodiments and appended Claims are understood to be modified by the word "about" except in the examples or where explicitly indicated otherwise. All range and ratio limits in the Brief Summary of the Invention, Detailed Description of the Embodiments and appended Claims are understood to be combinable.

While the invention has been presented in the Detailed Description of the Embodiments and appended Claims, it is understood that various modifications of this invention will become apparent to those skilled in the art upon reading this application. Therefore these various modifications, that fall within the scope of the appended Claims and/or Detailed Description, are considered to be a part of this invention.

What is claimed is:

1. An intermediate, comprising:
 a facestock having an upper surface and a lower surface; the facestock having at least one embossed pattern on the upper surface of the facestock;
 an adhesive layer having an upper surface and a lower a surface and wherein the upper surface of the adhesive layer is adhesively joined to the lower surface of the facestock; and
 a release liner having an upper surface and a lower surface wherein the upper surface of the release liner is releasably joined to the lower surface of the adhesive layer,
 wherein the facestock includes a first layer with an upper surface and a lower surface, a second layer having an upper surface and a lower surface wherein the upper surface of the second layer underlies the lower surface of the first layer, and a third layer with an upper surface and a lower surface wherein the upper surface of the third layer underlies the lower surface of the second layer,
 wherein the first layer is clear and comprises polypropylene;
 wherein the second layer is opaque and comprises low density polyethylene; and
 wherein the third layer is clear and comprises poly(ethylene terephthalate).

2. An intermediate, comprising:
 a facestock having an upper surface and a lower surface; the facestock having at least one embossed pattern on the upper surface of the facestock;
 an adhesive layer having an upper surface and a lower a surface and wherein the upper surface of the adhesive layer is adhesively joined to the lower surface of the facestock; and
 a release liner having an upper surface and a lower surface wherein the upper surface of the release liner is releasably joined to the lower surface of the adhesive layer,
 wherein the facestock includes a first layer with an upper surface and a lower surface and having at least one thermoplastic resin, and a second layer having an upper surface and a lower surface with at least one thermoplastic resin, wherein the upper surface of the second layer underlies the lower surface of the first layer, the at least one thermoplastic resin of the first layer has a Vicat softening point that is at least about 20° C. lower than the Vicat softening point of the at least one thermoplastic resin of the second layer, and the at least one embossed pattern is on the upper surface of the first layer;
 wherein the first layer has a TAPPI T425 opacity of less than or equal to 10%;
 wherein the second layer has a TAPPI T425 opacity of greater than or equal to 70%; and
 wherein the second layer is unembossed.

3. The intermediate of claim 2, wherein the facestock further includes at least one print layer; wherein the at least one print layer was present on the upper surface of the facestock before the at least one embossed pattern was formed.

4. The intermediate of claim 3, wherein the at least one print layer and the at least one embossed layer are aligned.

5. The intermediate of claim 3, wherein the at least one print layer and the at least one embossed layer are not aligned.

6. The intermediate of claim 2, wherein the embossed pattern is formed in the facestock after the adhesive layer has been joined to the facestock and the release liner has been joined to the adhesive layer.

7. The intermediate of claim 2, wherein the release liner has at least one layer wherein the layer includes at least one thermoplastic resin.

8. The intermediate of claim 2, wherein the release liner has at least one layer wherein the layer includes a polyester resin.

9. A container labelled with the intermediate of claim 2, wherein the lower surface of the adhesive layer is adhesively joined to an outside surface of the container and the container has an embossed appearance.

10. The intermediate of claim 2, wherein the facestock further comprises a third layer having an upper surface and a lower surface with at least one thermoplastic resin, wherein the first layer, second layer and third layer are different from each other, the upper surface of the second layer underlies the lower surface of the first layer, the upper surface of the third layer underlies the lower surface of the second layer, each of the at least one thermoplastic resins of the first layer and the second layer has a Vicat softening point that is at least about 20° C. lower than the Vicat softening point of the at least one thermoplastic resin of the third layer, and the at least one embossed pattern is on the upper surface of the first layer.

11. The intermediate of claim 10, wherein the at least one thermoplastic resin of the second layer has a Vicat softening point that is at least about 10° C. lower than the Vicat softening point of the at least one thermoplastic resin of the first layer.

12. The intermediate of claim 11, wherein the first layer comprises a polypropylene, the second layer comprises a polyethylene, and the third layer comprises a polyester.

13. The intermediate of claim 2, wherein the release liner is in continuous contact with the adhesive layer.

14. The intermediate of claim 2, wherein the release liner is the only material on a side of the adhesive layer opposite the facestock.

15. The intermediate of claim 2, wherein the adhesive layer is 50% to 90% thinner at the at least one embossed section than at the at least one unembossed section.

16. The intermediate of claim 2, wherein the second layer comprises a polycarbonate or a polyamide.

17. The intermediate of claim 2, wherein the facestock or the adhesive layer comprises a UV-visible dye or a thermochromic dye or pigment.

18. The intermediate of claim 2, wherein the first layer has a TAPPI T425 opacity of less than or equal to 8%; and wherein the second layer has a TAPPI T425 opacity of greater than or equal to 80%.

19. The intermediate of claim 2, wherein the first layer has a TAPPI T425 opacity of less than or equal to 5%; and wherein the second layer has a TAPPI T425 opacity of greater than or equal to 90%.

20. An intermediate, comprising:
a facestock having an upper surface and a lower surface; the facestock having at least one embossed pattern on the upper surface of the facestock;
an adhesive layer having an upper surface and a lower a surface and wherein the upper surface of the adhesive layer is adhesively joined to the lower surface of the facestock; and
a release liner having an upper surface and a lower surface wherein the upper surface of the release liner is releasably joined to the lower surface of the adhesive layer,
wherein the embossed pattern includes at least one embossed section and at least one unembossed section on the facestock, and wherein the adhesive layer is at least 20% thinner at the at least one embossed section than at the at least one unembossed section;
wherein the facestock includes a first layer with an upper surface and a lower surface and having at least one thermoplastic resin, and a second layer having an upper surface and a lower surface with at least one thermoplastic resin, wherein the upper surface of the second layer underlies the lower surface of the first layer, the at least one thermoplastic resin of the first layer has a Vicat softening point that is at least about 20° C. lower than the Vicat softening point of the at least one thermoplastic resin of the second layer, and the at least one embossed pattern is on the upper surface of the first layer;
wherein the first layer has a TAPPI T425 opacity of less than or equal to 10%;
wherein the second layer has a TAPPI T425 opacity of greater than or equal to 70%; and
wherein the second layer is unembossed.

21. The intermediate of claim 20, wherein the at least one thermoplastic resin of the first layer comprises a polyolefin, and the at least one thermoplastic resin of the second layer includes a thermoplastic resin selected from the group including a polyester, a polyamide, a polycarbonate, and a mixture of two or more of any of the foregoing thermoplastic resins.

22. The intermediate of claim 20, wherein the at least one thermoplastic resin of the first layer has a Vicat softening point that is at least about 30° C. lower than the Vicat softening point of the at least one thermoplastic resin of the second layer.

23. The intermediate of claim 20, wherein the at least one thermoplastic resin of the first layer has a Vicat softening point that is at least about 40° C. lower than the Vicat softening point of the at least one thermoplastic resin of the second layer.

* * * * *